United States Patent [19]

Floyd et al.

[11] 3,890,891

[45] June 24, 1975

[54] TAGGING ATTACHMENT FOR HAY BALER

[76] Inventors: Don D. Floyd, 359 J St.; Lee M. Whittle, 598 W. Fredrick Rd., both of Brawley, Calif. 92227

[22] Filed: Aug. 9, 1974

[21] Appl. No.: 496,063

[52] U.S. Cl. ............... 100/102; 40/305; 53/50; 83/205; 83/278; 226/77
[51] Int. Cl. .............................................. B30b 15/00
[58] Field of Search ............ 40/305; 53/50; 83/205, 83/278; 226/77; 100/44, 102

[56] References Cited
UNITED STATES PATENTS

| | | | |
|---|---|---|---|
| 1,066,467 | 7/1913 | Chenette | 40/305 X |
| 1,994,947 | 3/1935 | Gaus | 100/102 |
| 1,996,328 | 4/1935 | Gaus | 100/102 |
| 2,131,843 | 10/1938 | McMakin | 53/50 |
| 3,232,215 | 2/1966 | Agle | 100/102 X |
| 3,523,400 | 8/1970 | Daily | 53/50 X |

*Primary Examiner*—Billy J. Wilhite
*Attorney, Agent, or Firm*—Brown & Martin

[57] ABSTRACT

A tagging attachment for a hay baler for automatically inserting an identification tag into a hay bale at a specific preselected location, as the bale is being formed. The attachment mounts on the side of the baler and has a nozzle which projects into the bale forming chamber. Tags are stored in roll form in the attachment and are advanced individually to extend from the nozzle, the advancement being timed to occur between selected strokes of the hay packing plunger, which forms the bale in multiple layers. A knife, actuated by advancement of a layer of hay, cuts off the extended tag and traps it in the bale.

10 Claims, 8 Drawing Figures

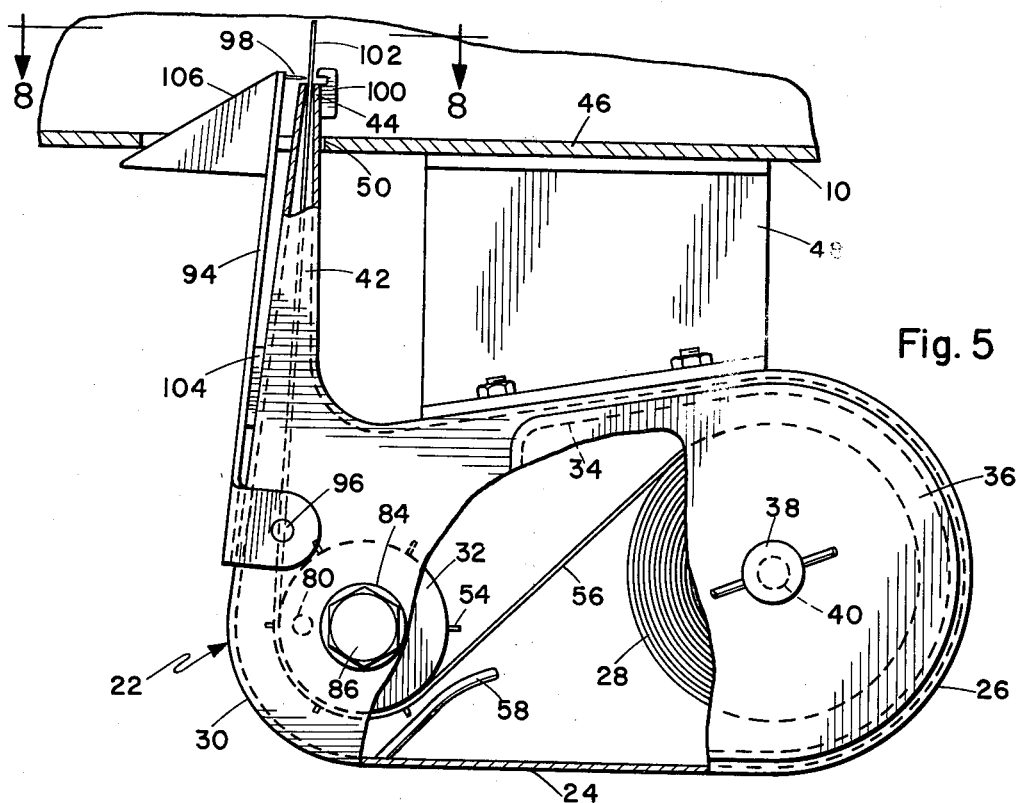
Fig. 5
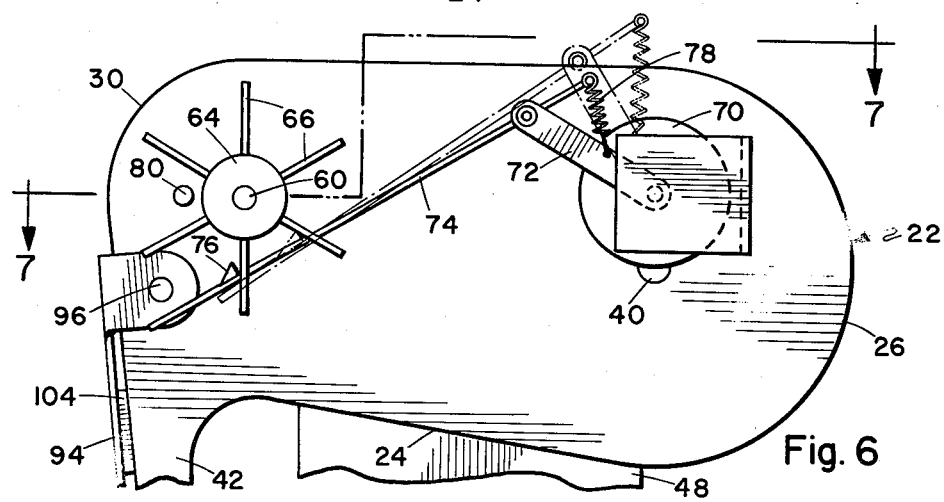
Fig. 6
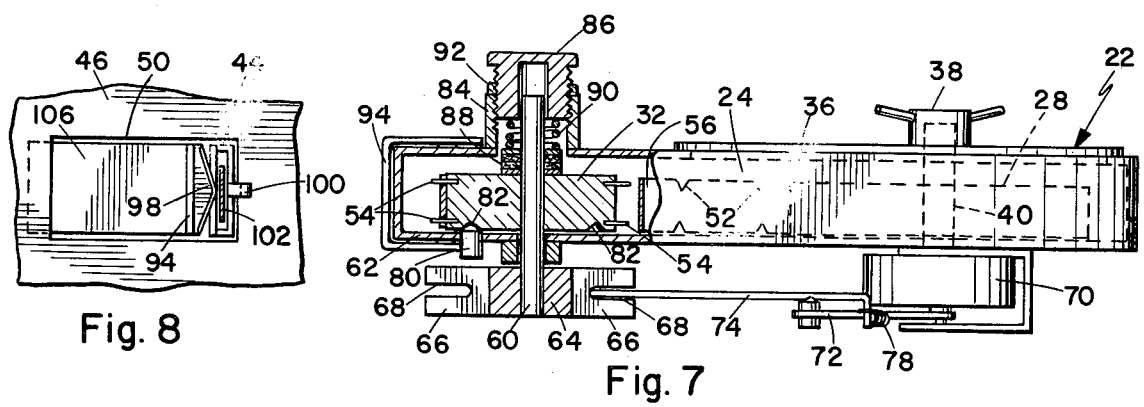
Fig. 8
Fig. 7

TAGGING ATTACHMENT FOR HAY BALER

BACKGROUND OF THE INVENTION

It is not common practice to tag or label baled hay to indicate the source, for advertising or other reasons. Labelling enables dealers and purchasers to trace the origin and maintain quality control checks on hay from specific sources. In case of theft, such labelling makes it easy to identify the hay, but external labelling is easily removed and not reliable. Devices have been developed to insert labels or tags into hay bales during or after baling. The concealed tags provide positive identification, but require breaking apart and searching the bale, which is not always practical. It would be a great advantage to be able to locate tags in a hay bale, without opening the bale, by knowing the tag locations used by individual sources.

SUMMARY OF THE INVENTION

The tagging apparatus described herein is a simple attachment which can be mounted on most types of hay balers with a minimum of modification. In conventional balers, the hay is compacted by a plunger in successive layers and tied by wire or plastic twine, the length of the bale and the number of layers being variable in most machines. The tagging attachment is synchronized with the baler to insert a tag between specific selected layers of the bale, at a position coded to the particular source. The tag would normally carry the name of the farmer or company which produced the hay, to serve as advertising as well as identification.

The attachment is a casing which is secured on the side of the baler and has a nozzle which projects a short distance into the baling chamber, generally at the position of the plunger at the compacting end of its stroke. Tags are stored in the container in roll form and are advanced by an indexing mechanism to extend one tag at a time from the nozzle. The indexing mechanism is synchronized with the baler mechanism to extend a tag at the compression end of a compacting stroke of the baling plunger. When the plunger is retracted for the next stroke, the tag is left extended ahead of the already compacted layers of hay. On the next stroke, the advancing hay actuates a knife attached to the nozzle, cutting off the tag and trapping it between the layers near the outside of the bale. The action can be timed to place the tag between any selected layers of hay along the length of the bale, according to a code determined for the particular source. Since the orientation of the bale at the time of forming can be found from the configuration of the tie wires and knots, it is a simple matter to locate a tag, once the coded location is known.

The primary object of this invention, therefore, is to provide a new and improved tagging attachment for a hay baler.

Another object of this invention is to provide a tagging attachment which will insert a tag at a specific location in a hay bale.

Another object of this invention is to provide a tagging attachment which operates automatically in synchronization with the hay balers.

A further object of this invention is to provide a tagging attachment which is adaptable to existing hay balers with a minimum of modification.

Other objects and advantages will be apparent in the following detailed description, taken in conjunction with the accompanying drawings, in which:

FIG. 5 is an enlarged top plan view of the tagging attachment, with portions cut away.

FIG. 6 is an underside view of the attachment.

FIG. 7 is a sectional view taken on line 7—7 of FIG. 5.

FIG. 8 is a view taken in the direction of arrows 8—8 of FIG. 5.

DESCRIPTION OF THE PREFERRED EMBODIMENT

Figure 1:
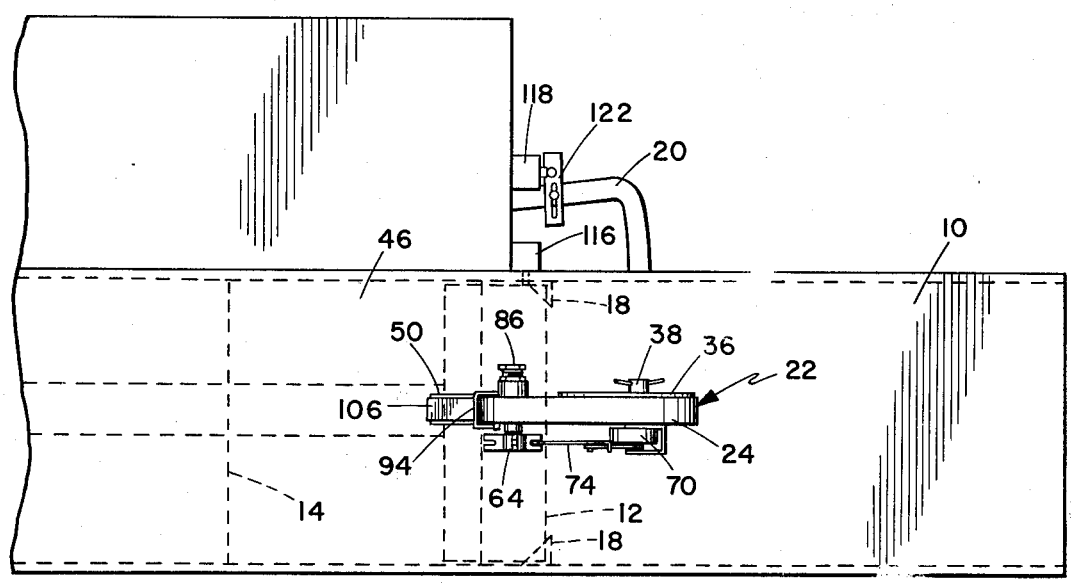
FIG. 1 is a side elevation view of a portion of a hay baler, with the tagging attachment installed.
Figure 2:
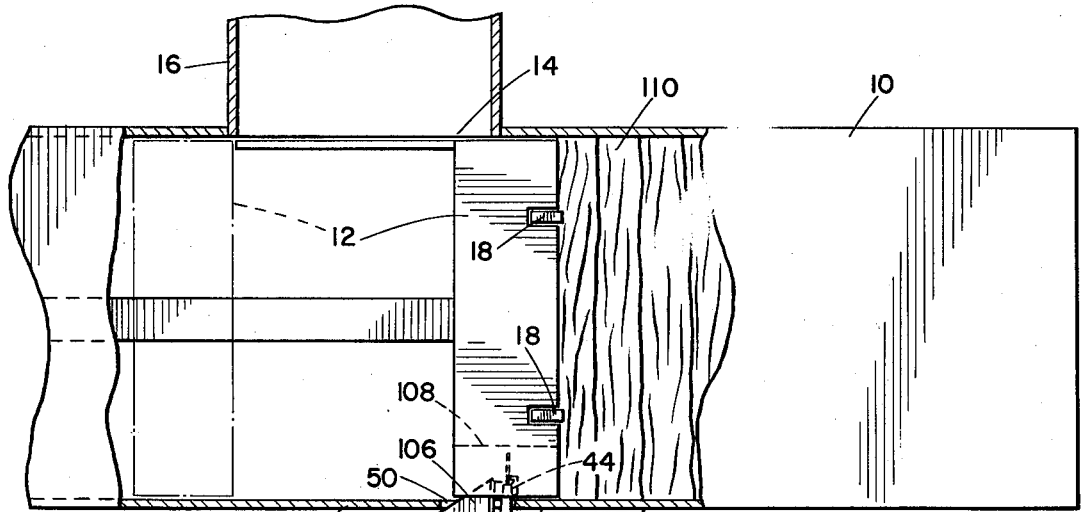
FIG. 2 is a top plan view of the structure, partially cut away.

A typical hay baler, illustrated partially in FIGS. 1 and 2, has an elongated baling chamber 10 of generally rectangular cross section, in which a reciprocating plunger 12 compacts the hay. At one side of the baling chamber 10 is an inlet opening 14, through which hay is fed from a pick-up section 16. A hay bale is built up in layers by successive strokes of the plunger, the chamber 10 having internal dogs 18 to hold the compacted hay in place as the plunger retracts for the next stroke.

The mechanisms for driving the plunger, operating the pick-up and feed, tying and knotting the baling wire and other operations, are all well known and vary in different machines. One type of machine on which the tagging attachment is particularly adaptable is the New Holland Hayliner. This particular machine has a bale length adjustment trip arm 20, which rises and falls once as each bale is formed, the significance of which is hereinafter described.

The tagging attachment 22 has a casing 24 with a large cylindrical end 26 to hold a roll of tags 28, and a small cylindrical end 30 in which a feed wheel 32 is mounted. The casing 24 is substantially flat and need only be deep enough to clear the thickness of the roll of tags. The roll is accessible through a top opening 34, which is closed by a cover 36, the cover being held in place by a nut 38 threaded on a post 40, which serves as a spindle for the tag roll. Extending from one side of the casing at the small end 30 is a hollow arm 42, with a narrow tip or nozzle 44. The attachment 22 is secured on the side wall 46 of baling chamber 10 by any suitable bracket 48, with the nozzle 44 projecting about 1 inch into the chamber through a slot 50 in the side wall, as in FIG. 5.

The tags are conventional ticket type with separating notches 52 to facilitate tearing. Feed wheel 32 has radially projecting prongs 54 to engage the notches 52 and provide positive feed of the tag strip 56 which is carried around the wheel and through arm 42 to project from nozzle 44. Guides 58 fixed on the inside of casing 24 retain the tags in engagement with feed wheel 32.

The feed wheel is fixed to a shaft 60 which projects downwardly through the bottom panel 62 of casing 24. On the lower end of shaft 60 is a star wheel 64 having vanes 66 corresponding in number and spacing to the prongs 54, each vane having an open ended radial slot 68. Secured to bottom panel 62 under the large end 26 is a rotary solenoid 70 having an actuating arm 72. A pull rod 74 is pivotally attached to arm 72 and passes through the slots 68 in the star wheel vanes, the pull rod having a pawl 76 which engages one vane 66. A spring 78 connected between pull rod 74 and arm 72 holds the pull rod in place in the star wheel slots. Each time solenoid 70 is actuated as in broken line in FIG. 6, pull rod 74 turns the star wheel 64 and rotates feed wheel 32 to advance the tag strip 56 one tag length. A spring detent 80 in bottom panel 62 engages sockets 82 in feed wheel 32, to index the feed wheel for proper tag spacing. When the solenoid 70 is de-energized, pull rod 74 slides through the slots 68 and pawl 76 rides over the just pulled vane to engage the next successive vane, as in the full line position in FIG. 6. It should be understood that the feed mechanism shown is exemplary and other means may be equally suitable.

To prevent slippage and free running of the tags, the feed wheel is provided with a friction brake. On top of casing 24 coaxial with shaft 60 is a threaded sleeve 84, in which is a screw plug 86. On shaft 60 are stacked friction washers 88, which are held against the feed wheel by a spring 90 between the washers and plug 86. The braking pressure is set as required by turning plug 86, which is then secured by a lock nut 92.

At the small end of casing 24 is a knife bar 94 extending along the outside of arm 42 and pivotally attached to the casing by hinge pins 96. The bar 94 extends just beyond nozzle 44 and carries a knife blade 98, which can move across the end of the nozzle into an anvil 100 fixed on the inside of arm 42, to cut off a projecting tag 102. A resilient block 104 between bar 94 and arm 42 acts as a return spring to hold to arm outwardly with the knife blade just clear of the nozzle. On the outer face of the bar 94 is a wedge block 106, which projects into the baling chamber through slot 50.

Figure 3:
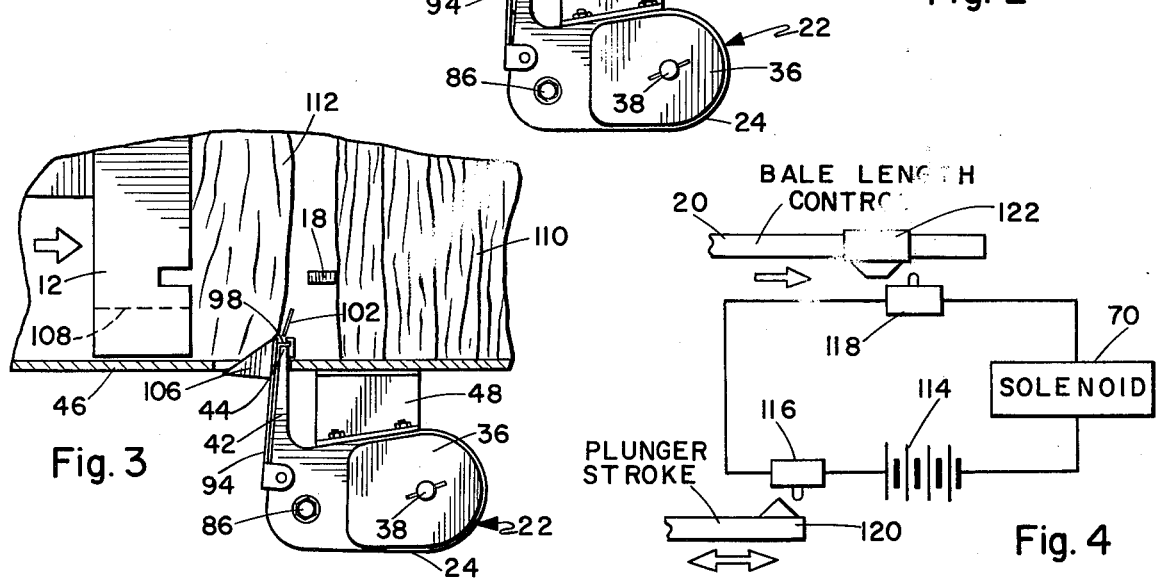
FIG. 3 is a view similar to a portion of FIG. 2, showing the tag cutting and trapping action.

The attachment 22 is positioned so that when plunger 12 is at the extended end of its compacting stroke, nozzle 44 projects into a clearance channel 108 in the plunger, at which time the solenoid 70 is actuated to extend tag 102. When the plunger is retracted, as in the broken line position in FIG. 2, the compacted hay 110 is held by dogs 18 and tag 102 projects into the open chamber. The next load of hay through inlet opening 14 is then picked up by the plunger and driven into the baling chamber. As illustrated in FIG. 3, the hay 112 strikes wedge block 106 and drives the knife blade 98 to cut off tag 102, which is then trapped between the layers of hay just inside the surface of the bale. It has been found that the wedge block 106 provides ample area for the hay to make the cutting action, but deflects the hay enough to prevent jamming around nozzle 44.

Figure 4:
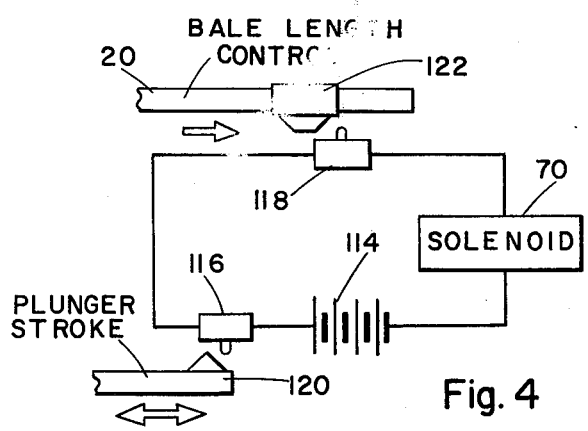
FIG. 4 is a diagram of the tag insertion control system.

One simple means for timing the tag injection to the required layer in the bale is illustrated in FIG. 4. Solenoid 70 is powered by a battery 114 and controlled by two switches 116 and 118 in series. Switch 116 is actuated at each stroke of plunger 12, either directly or by a portion of the actuating mechanism 120, depending on the particular arrangement of the machine. Switch 118 is actuated by an adjustable trigger 122 on trip arm 20, or any other portion of the machine which moves in correspondence to the length of the bale. Thus the solenoid 70 is actuated only when both switches are closed, at a selected position along the length of the bale. The operation is automatic and does not require the attention of the operator, other than to replenish the supply of tags when necessary.

Having described our invention, we now claim:

1. A tagging attachment for a hay baler having a baling chamber with hay inlet, a reciprocating plunger for compacting hay in successive layers in the chamber to form a bale, holding means for holding compacted layers of hay in the chamber between strokes of the plunger, and control means for controlling the length of a bale, the tagging attachment comprising:

a casing having means for holding a roll of tags therein;

a hollow arm extending from said casing and having an end nozzle thereon;

mounting means for holding the casing on the hay baler with said nozzle projecting into the baling chamber;

feed means in said casings for feeding tags from the roll and through said arm, to extend one at a time from said nozzle;

a knife mounted on said arm for cutting off the extended tag;

and timing means for timing the knife action to cut off the tag between predetermined layers of the hay bale.

2. A tagging attachment according to claim 1, wherein said knife projects into the path of and is actuated by hay being compacted by the plunger.

3. A tagging attachment according to claim 1, and including a bar pivotally mounted on said casing and extending into the baling chamber in the path of hay being compacted by the plunger, said knife being fixed on said bar to pass across said nozzle.

4. A tagging attachment according to claim 3, and including a wedge block fixed to the portion of said bar extending into the baling chamber, said wedge block being inclined to deflect hay over the knife.

5. A tagging attachment according to claim 4, and including resilient return means between said bar and said casing for holding the knife normally clear of said nozzle.

6. A tagging attachment according to claim 1, wherein said feed means includes a feed wheel around which the tags pass, and actuating means for rotating the feed wheel in increments corresponding to the length of one tag.

7. A tagging attachment according to claim 6, wherein said feed wheel has projecting prongs for positive engagement with the tags, and indexing means for indexing the feed wheel at the increments of rotation.

8. A tagging attachment according to claim 6, wherein said actuating means is a solenoid with switch means responsive to motion of the plunger to extend a tag after one layer of hay is compacted and before the next layer is advanced.

9. A tagging attachment according to claim 8, wherein said switch means includes a first switch actuated at each stroke of the plunger and a second switch, in series with the first, actuated by the bale length control means at a specific layer position in a bale.

10. A tagging attachment according to claim 8, wherein said nozzle extends into the baling chamber at the position of the plunger at the compacting end of the stroke, the plunger having a channel to clear the nozzle and a tag extending therefrom.

* * * * *